United States Patent [19]

Arai et al.

[11] 4,310,370
[45] Jan. 12, 1982

[54] PROCESS FOR PRODUCING DECORATIVE ARTICLES

[75] Inventors: Eisuke Arai, Urawa; Fumio Takagi, Tokyo; Yasuaki Ishii, Matsudo; Kuniaki Kamei, Kodaira, all of Japan

[73] Assignee: Dai Nippon Insatsu Kabushiki Kaisha, Tokyo, Japan

[21] Appl. No.: 81,354

[22] Filed: Oct. 3, 1979

[30] Foreign Application Priority Data

Oct. 6, 1978 [JP] Japan .................................. 53-123311

[51] Int. Cl.³ .......................... B05D 3/00; B05D 5/02; B32B 3/30
[52] U.S. Cl. ................................... 156/220; 156/219; 156/247; 264/293; 427/271; 427/273; 427/277; 427/278; 428/141; 428/156; 428/172; 428/195; 428/703
[58] Field of Search ............... 156/209, 219, 220, 247; 264/293; 428/156, 172, 141, 195, 703; 427/271-273, 277, 278

[56] References Cited

U.S. PATENT DOCUMENTS 4,105,816  8/1978  Hori ................................ 428/172 X

FOREIGN PATENT DOCUMENTS 52-91061  8/1977  Japan .

*Primary Examiner*—Bruce H. Hess
*Attorney, Agent, or Firm*—Kenyon & Kenyon

[57] ABSTRACT

A process for producing decorative articles having patterns of surface concavities and convexities (unevennesses) comprises the steps of:
(1) placing into mutual contact and laminating a hardenable decorative material layer and an expansion-contraction deformable sheet provided with regions susceptible to expansion-contraction deformation and regions not susceptible to said deformation;
(2) causing the deformable sheet to undergo said deformation under pressure thereby to impart a pattern of unevennesses to the decorative material layer in contact with the sheet; and
(3) causing the hardenable decorative material layer to fully harden.

The sheet deformed under pressure imparts a unique pattern of surface unevennesses corresponding to the two kinds of regions to the decorative material layer. Decorative articles thus obtained can be applied to a wide variety of uses as materials for decorating architectural exteriors and interiors and as decorative boards. The degree of surface unevenness can be controlled by adjusting the pressure. Colored patterns corresponding to the unevennesses can also be formed.

19 Claims, 19 Drawing Figures

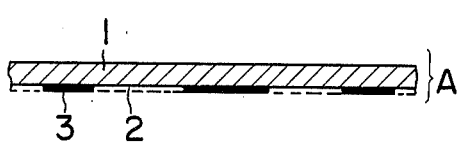
FIG. I
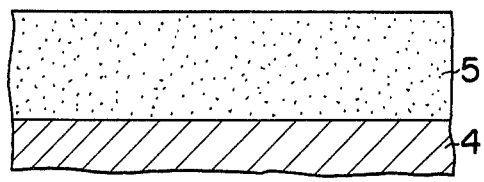
FIG. 2
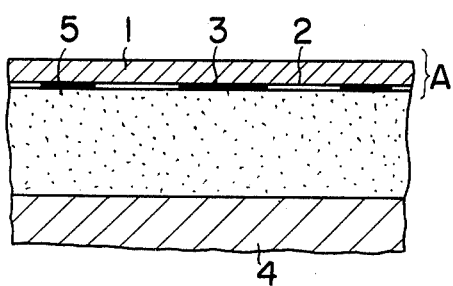
FIG. 3
PRIOR ART
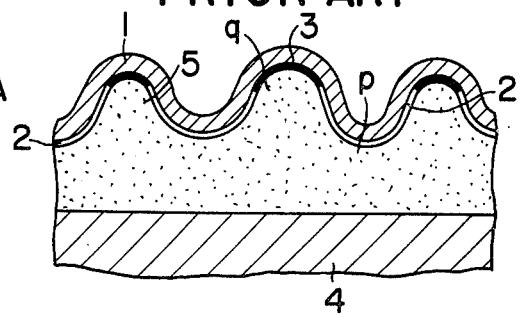
FIG. 4
PRIOR ART
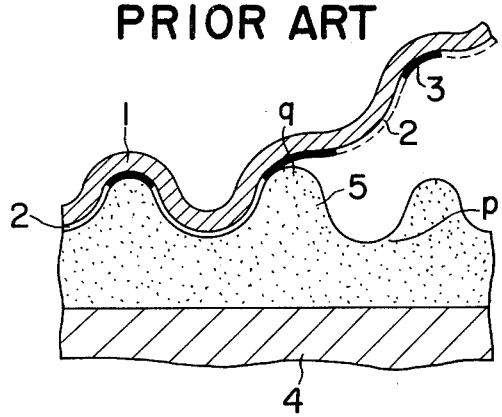
FIG. 5a
PRIOR ART
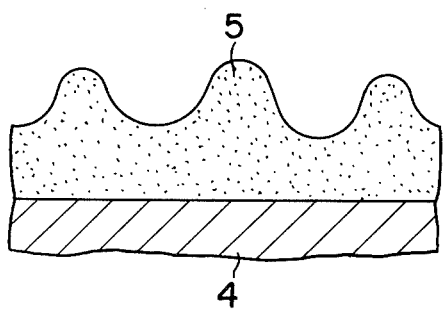
FIG. 5b
PRIOR ART

PROCESS FOR PRODUCING DECORATIVE ARTICLES

BACKGROUND OF THE INVENTION

This invention relates generally to processes for imparting desired patterns of surface depressions and protuberances or concavities and convexities (hereinafter referred to as surface "unevenness") to the surfaces of decorative materials or articles. More particularly, the invention relates to a process wherein a sheet having expansion-contraction deformability which differs with different regions thereof is caused to undergo expansion-contraction deformation, and a clear unevenness pattern corresponding faithfully to these regions is imparted to a decorative material layer in contact with the sheet.

Examples of processes heretofore known for imparting unevenness patterns on surfaces are a process wherein, by means of an embossing roller with a relief or embossed pattern on the surface thereof, the pattern is mechanically impressed on the surface to be embossed and a process wherein a material for constituting a decorative layer is poured into a metal mold. However, while the pattern can be formed faithfully according to the embossed pattern or mold by these processes, the roller, plate, or mold is expensive, and the production efficiency is poor. In many cases, furthermore, complicated accessory equipment and operation are required.

In addition, for producing decorative articles having unevenness patterns without using metal molds, there are processes such as that wherein expansion or foaming is caused regionally or the degree of expansion is regionally varied. In general, however, these processes are accompanied by the problem of limitation of the materials which can be used therein.

As a result of our various studies previously directed toward a simple method of forming any desired unevenness pattern, we have found that, by utilizing the characteristic of various resin sheets, films, and the like of deforming by expansion or contraction when they contact a liquid having affinity therefor by providing on a sheet or film of this character regions which are not subject to the effect of such a liquid or regions differing in the degree in which they are affected by the liquid, for example, by printing, and causing the sheet or film to contact a decorative material layer containing an ingredient which gives rise to expansion or contraction deformation (hereinafter referred to simply as deformation) in the sheet or film, an unevenness pattern corresponding to the printed pattern is imparted to the decorative material layer. On the basis of this discovery, we have developed a process for producing decorative articles, as disclosed in the specification of Japanese Patent Laid Open No. 91061/1977.

More specifically, this process for producing decorative articles comprises the steps of superposing on a decorative layer prior to treatment a sheet provided with regions subject to deformation and regions not subject to deformation due to ingredients constituting the decorative layer, and/or regions having differences of degree of susceptibility to deformation, and then carrying out an appropriate after-treatment, depending on the ingredients constituting the decorative layer, thereby to cause the formation on the decorative layer of unevenness corresponding to the various regions. By this process, if a wood grain pattern, for example, is printed on the sheet, an unevenness pattern corresponding to this wood grain pattern can be imparted to the decorative layer composed of, for example, a concrete composition.

SUMMARY OF THE INVENTION

It is a general object of this invention to provide improvements in the above described process for producing the above mentioned decorative articles.

More specifically, in the unevenness pattern obtained by the above described process, a difficulty is encountered in that the boundary between the concave parts and the convex parts is indistinct, whereby the effect of visual appeal to the viewer is deficient. Furthermore, the fidelity of the unevenness formed on the decorative layer relative to the pattern provided on the expansion-contraction deformable (hereinafter referred to simply as deformable) sheet cannot yet be said to be amply satisfactory. For this reason, decorative articles with a sufficient marketability could not be obtained.

As a result of our study with respect to these difficulties, we have found that they can be unexpectedly overcome at one stroke by carrying out the above described deformation of the sheet under pressure. We have found further that, in the case where the deformation regions of the sheet are relatively wide it is possible to control to a considerable degree the minute unevenness pattern produced on the decorative material layer to correspond to the deformation regions by controllably varying the magnitude of the applied pressure. It was found that, accordingly, as a result of the combination of these effects, decorative articles of remarkably improved appearance of great appeal to the viewer can be obtained.

The process of producing decorative articles having surface unevenness patterns of this invention is based on these findings and is characterized by comprising the following process steps.

(1) Placing into mutual contact and laminating a hardenable decorative layer and a deformable sheet provided with first regions susceptible to deformation, second regions not susceptible to deformation, and/or third regions of a degree of susceptibility to deformation differing from that of the first regions.

(2) Causing the deformable sheet to undergo deformation under pressure thereby to impart a pattern of unevenness corresponding to the regions provided on the deformable sheet to the decorative layer in contact therewith.

(3) Causing the hardenable decorative layer to fully harden.

That the application of pressure results in the remarkable improvement in appearance of the decorative product described above was an unexpected discovery for us. The reason for this was as follows.

In the process disclosed in the specification of the aforementioned Japanese Patent Laid Open No. 91061/1977 (hereinafter referred to as the "pressure-less process"), the formation of the unevenness on the surface of the decorative article is considered to be due to forces resulting from the deformation of the deformable sheet through phenomena such as swelling due to a solvent or the like, and, furthermore, whether the parts of the decorative layer contacting the deformation parts of the sheet become concavities or whether they become convexities is also considered to be merely due to difference in the affinities of the decorative layer for the deformation parts and the non-deformation parts of the sheet.

The deformable sheet in this case is an extremely thin resin film ordinarily of a thickness of the order of 10 μm to 2 mm. Accordingly, it was not thought that the forces resulting from deformation exerted by such a thin resin film would be of a very large magnitude. It was thought, therefore, that if a deformable sheet of this character in the state of lamination thereof with the decorative layer were subjected to pressure, the forces for forming the unevenness due to the deformation of the sheet would be lost, and there would be absolutely no possibility of obtaining the desired unevenness pattern on the decorative layer.

Much to our surprise, however, we have newly discovered that, when pressure is applied to a laminated structure of the decorative layer and the deformable sheet, the boundaries of the unevenness imparted to the surface of the decorative layer become distinct and clear, although this effect depends somewhat on the magnitude of the pressure, and, contrary to our former expectation, a surface pattern wherein the differences between the concavities and convexities are visually increased is obtained.

The nature, utility, and further features of this invention will be more clearly apparent from the following detailed description beginning with a consideration of general aspects of the invention and concluding with specific examples of practice thereof, when read in conjunction with the accompanying drawings briefly described below.

BRIEF DESCRIPTION OF THE DRAWINGS

In the drawings, which are all enlarged, fragmentary sectional views taken in planes parallel to the thickness direction of the sheet articles or laminated sheet articles shown:

FIGS. 1 and 2 indicate process steps common to a known process and to the process of the invention;

FIGS. 3, 4, and 5 indicate steps in a known process; and

FIGS. 6 through 19 indicate steps in various processes embodying this invention, in which FIGS. 6, 7, and 8 show steps in the most fundamental mode of practice of the invention, while FIGS. 9 through 19 illustrate examples of other modes of practice.

DETAILED DESCRIPTION OF THE INVENTION

Figure 6:
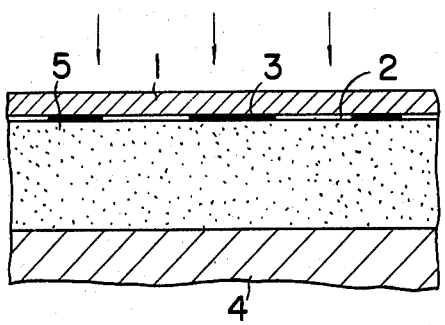

As conducive to a full understanding of this invention, the fundamental mode of practice of the aforementioned pressureless process for producing decorative articles will first be briefly described with reference to FIGS. 1 through 5.

As shown in FIG. 1, a deformable sheet A comprising a film material 1 and regions 2 and 3 respectively susceptible to and not susceptible to deformation provided on one surface of the film material 1 is prepared. Separately, a hardenable decorative layer 5 provided on an optional base material 4 is prepared as shown in FIG. 2. The deformable sheet A is superimposed on the decorative layer 5 on the base material 4 as shown in FIG. 3. Then the deformable sheet A is caused to deform, thereby to impart to the decorative layer 5 an unevenness pattern comprising concavities p and convexities q corresponding to the deformation parts 2 and non-deformation parts 3 of the sheet A as shown in FIG. 4.

Thereafter, the hardening of the decorative layer 5 is caused to be completed, and the sheet A is peeled off as indicated in FIG. 5a, whereby a decorative article having an unevenness pattern as shown in FIG. 5b is obtained.

The peeling off of the sheet A can be carried out at any desired time instant at which the decorative layer 5, in at least the time necessary for its further continuation of its hardening, has hardened to a degree at which it can retain the unevenness pattern. The peeling off of the sheet A with the layer 5 in a partially hardened state may even be desirable in some cases because of the ease in peeling off of the sheet A.

Figure 7:
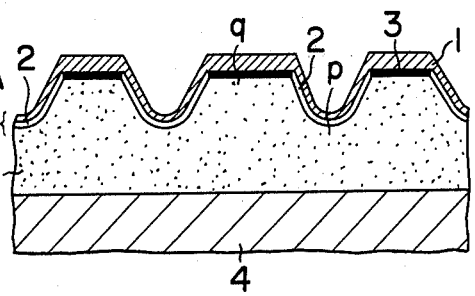
Figure 8:
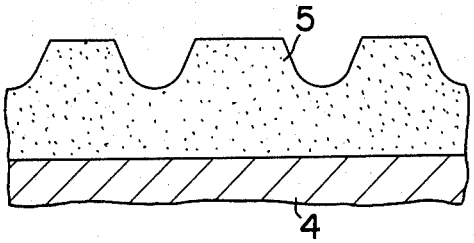

In the process according to this invention, the initial steps of the pressure-less deformation process as described above and illustrated in FIGS. 1, 2, and 3 are followed. Then, after the sheet A has been superimposed in laminated state on the decorative layer 5 as shown in FIG. 3, pressure is applied to the laminated structure as indicated in FIG. 6 at a time before the decorative layer 5 loses its deformability, preferably immediately after lamination. As a consequence, the laminated structure is deformed as shown in FIG. 7. Then, when the sheet A is peeled off after completion of hardening of the decorative layer 5, an unevenness pattern as shown in FIG. 8, in which the boundaries between the concavities and the convexities are clearly distinct, and the fidelity with respect to the printed pattern is excellent, is obtained. This improvement will be clearly apparent from a comparison of FIG. 5b and FIG. 8.

Prior to a detailed description of the various process steps mentioned above, the materials suitable for use in the different parts of laminated structure will be described.

The base material 4 is used according to necessity for purposes such as reinforcing the decorative layer 5 and facilitating forming and may be any solid material provided that there will not be any adverse effect mutually between this material and the decorative layer 5. Examples of such materials which can be used are: wood-product boards and sheets such as timber materials, plywoods, and particle boards; papers such as thin and thick papers, decorative papers, and corrugated cardboards; various woven fabrics and unwoven fabrics; various metal sheets such as steel sheets, stainless steel sheets, aluminum sheets, and copper sheets; various plastics boards, sheets, and films; various fibrous boards and sheets such as "hardboard"; various composite base materials of organic high-polymer compounds and inorganic substances such as gypsum boards, pulp-cement boards, rock-wool boards, wood wool (excelsior)-cement boards, and wood chip-cement boards; and various inorganic boards such as transite (asbestos-slate) boards and calcium silicate boards. These materials are subjected to preparation, such as pretreatment or application of adhesive, depending on the necessity.

The decorative material constituting the decorative layer 5 may be broadly divided into those of the aqueous system and the nonaqueous system depending on whether water or a nonaqueous solvent is used as the solvent or dispersing medium of the decorative material in its still unhardened state.

The aqueous decorative material is typically a hydraulic composition comprising a hydraulic substance such as a hydraulic cement such as portland cement, gypsum hemihydrate, or some other inorganic binder as a binder, a necessary additive added to the binder, and water with which the binder and the additive are mixed. Examples of additives which may be added are natural or synthetic resins such as a filler, an aggregate, a coloring agent such as a pigment or a dye, a plasticizer, a stabilizer, a hardening promoting or retarding agent, a hydration agent, an emulsifying agent, a thickening agent, and a foaming agent. In addition, aqueous decorative materials include natural or synthetic resin compositions with water as a solvent or a dispersing medium.

The nonaqueous decorative material is typically a composition containing a nonaqueous solvent as a solvent or dispersing medium and containing a natural or synthetic resin as a binder.

For the resin composition, irrespective of whether it is of the aqueous system or whether it is of the nonaqueous system, additives of the above kinds enumerated with respect to the aqueous decorative materials and a curing catalyst or initiator, a diluent, an inorganic acid, an organic acid, an inorganic salt, or the like are added as necessary, and the resulting composition is used as one of curing or setting type solvent type, emulsion type, dispersion type, and sol type.

For the resin, known resins can be used. Examples of these resins are thermoplastic resins which are homopolymers or copolymers of monomers, examples of these monomers being: vinyl halogenide monomers such as vinyl chloride and vinylidene chloride; styrene and derivatives thereof; vinyl ester monomers such as vinyl acetate; allyl alcohol and allyl esters; unsaturated carboxylic acids such as acrylic acid, methacrylic acid, itaconic acid, crotonic acid, maleic acid, and fumaric acid; ester derivatives of these unsaturated carboxylic acids; nitrile derivatives and acid amide derivatives of these unsaturated carboxylic acids; and N-methylol derivatives and N-alkylmethylolether derivatives of the acid amide derivatives of the above enumerated unsaturated carboxylic acids.

Other examples of the above mentioned monomers are glycidyl acrylate, glycidyl methacrylate, allyl glycidyl ether, vinyl isocyanate, allyl isocyanate, 2-hydroxyethyl acrylate and methacrylate, 2-hydroxypropyl acrylate and methacrylate, ethylene glycol monoacrylate and methacrylate, ethylene glycol diacrylate and methacrylate, maleic anhydride, itaconic anhydride, methyl vinyl ketone, butadiene, ethylene, propylene, dimethylaminoethyl methacrylate, vinylpyridine, tert-butylaminoethyl methacryle, and monoallylether of polyhydric alcohols.

Still other examples of the above mentioned usable resin are: thermosetting resins such as polyamide resins, polyester resins, phenolic resins, melamine resins, urea resins, epoxy resins, diallyl phthalate resins, silicon resins, and polyurethane resins; modified resins, precondensates, and the like of these thermosetting resins; and other resins such as natural resins, rosins and derivatives thereof, cellulose derivatives, natural and synthetic rubbers, and petroleum resins.

For the nonaqueous solvent, known solvents can be used. Examples of such solvents are: aliphatic hydrocarbons such as pentane, hexane, heptane, octane, and the like and mixtures thereof including gasoline, petroleum, benzine, mineral spirits, and petroleum naphtha; alicyclic hydrocarbons such as cyclohexane; aromatic hydrocarbons such as benzene, toluene, xylene, and ethyl benzene; halogenated hydrocarbons such as trichloroethylene, perchloroethylene, chloroform, and carbon tetrachloride; monohydric alcohols such as methyl alcohol, ethyl alcohol, propyl alcohol, butyl alcohol, amyl alcohol, and benzyl alcohol; polyhydric alcohols such as ethylene glycol, propylene, glycol, and glycerine; ketones such as acetone, methyl ethyl ketone, methyl isobutyl ketone, cyclohexanone, and isophorone; ethers such as ethyl ether, isopropyl ether, ethylene glycol monomethyl ether, ethylene glycol monoethyl ether, diethylene glycol monomethyl ether, and diethylene glycol monoethyl ether; esters such as acetic esters and butyric esters; nitrohydrocarbons; nitriles; amines; acetals; acids; and furans. These solvents can be used singly or as mixtures thereof.

In the mechanism of hardening of the above described decorative material, hydration setting of a hydraulic composition, setting of a thermosetting resin, solidification through evaporation of the solvent or dispersing medium due to natural drying or heat drying of solutions, emulsions, pastes, and other forms of thermoplastic resins, gelation thereof, polymerization hardening of monomers, and other hardening phenomena are included.

Examples of the film material 1 to be used as a starting material of the deformable sheet A are: cellulose-based films such as cellphane; various plastic films such as polyethylene film, polypropylene film, polystyrene film, polyvinyl chloride film, polyvinylidene chloride film, polyvinyl alcohol film, fluorinated resin film, polycarbonate film, acetate film, polyester film, polyamide film, rubber hydrochloride film, ionomer film, polyimide film, polyurethane film, and polymethacrylate; plastic films of blends of above enumerated polymers and copolymers thereof; various crosslinked plastic films; and various shrinkable plastic films. These films can be used singly or as a composite film formed by laminating two or more thereof. In addition to plastic films, sheets of various papers, synthetic papers, woven fabrics, unwoven fabrics, and other sheet materials of thicknesses of approximately 10 $\mu$m to 2 mm., for example, can be used.

In the process stage of preparing the composition prior to forming the film of these materials, additives such as a water repellent, a die or mold lubricant, a filler, a softening agent, a plasticizer, a stabilizer, an antistatic agent, and an agent for prevention of deterioration by ultraviolet rays are added to these materials. In some cases the surfaces of these materials can be subjected to any of various surface treatments.

The process of producing the deformable sheet A from such a film material will now be described.

First, the manner in which the deformation parts 2 of the deformable sheet A is caused to deform will be considered. A number of methods for accomplishing this are possible. For example, the heat deformability of the film part can be utilized. More specifically, in the case where the deformation parts 2 of the sheet A are of heat deformable film material, if heating (for example by utilizing a hot-plate press) is carried out simultaneously with application of pressure as indicated in FIG. 6, the deformation parts 2 will release their formation stress and undergo deformation. Particularly in the case of oriented or prestretched film, a great shrinkage deformation occurs. In this case, in order to establish the non-deformation parts 3, the heat deformability of these parts is suppressed by a method such as heat fixing beforehand these parts of the heat deformable film, applying on these parts an ink with a resin having a property of not stretching and shrinking under heat as a vehicle, or sticking a film of a resin of this character on these parts 3.

However, a preferred mode of practice is to utilize the affinity of the film material as above described for liquids. More specifically, the above described film material (hereinafter referred to simply as "film") may be broadly divided into hydrophilic films and films with affinity for nonaqueous solvents (hereinafter referred to as "solvent-affinity" films). A hydrophilic film and a solvent-affinity film are herein respectively defined as films having the property of undergoing impregnation, swelling or partial dissolution in accordance with their respective affinities thereby to deform when they respectively contact water (not only neutral water but also including acid or alkaline water) and a nonaqueous solvent (inclusive of liquid resins having hardenability).

Whether any of the above enumerated various films is a hydrophilic film or a solvent-affinity film depends on the hydrophilic or solvent-affinity nature of the resin constituting that film. Furthermore, the deformability of the sheet depends not only on the kind of resin constituting the sheet but also on the history of the production of that sheet. Therefore, it is advisable to determine beforehand the deforming characteristic of each sheet by a testing procedure such as coating the sheet with water or a nonaqueous solvent or heating the sheet.

One possible method of providing the non-deformation parts 3 on parts of the deformable film 1 comprising a hydrophilic film or a solvent-affinity film as described above comprises carrying out electron-ray crosslinking of the pertinent parts of the deformable sheet or fixing pertinent parts of a shrinkable film. Still another possible method comprises sticking or superimposing on the side of the sheet to contact the affinity liquid a sheet having no affinity for the affinity liquid.

However, the most standard and easiest method, which, moreover, has maximum decorative value comprises coating desired parts of the deformable sheet on the side thereof to contact the affinity liquid with an ink or a paint containing as a vehicle a resin having no affinity for that liquid thereby to form the non-deformation parts 3 and the remainder deformable parts 2 as shown in FIG. 1. This coating can be carried out by a known method such as, for example: a printing method such as intaglio or copperplate printing, lithographic printing, letterpress printing, or screen process printing; a coat application method such as brush coating, spatula coating, or spraying; or some other technique such as decorative painting with a hand, an art brush, or the like. By such a coating method, regions as desired of alphabetic characters, drawings, symbols and marks, a picture pattern or design, etc. can be provided.

In addition, a method of using a non-deformable film as a starting material and causing selected parts thereof to deteriorate by a method such as irradiation with ultraviolet rays to increase their affinity for a liquid and thereby to form the deformation parts 2 is also possible.

In the selection of the deformable sheet A, it is preferable to select a sheet whose deformation part 2 (and, therefore, ordinarily, the deformable film 1 itself) has affinity for the liquid contained in the hardenable decorative layer 5. More specifically, in the case where the decorative material 5 is of the aqueous system type or the nonaqueous system type, it is desirable to select sheets whose deformation parts 2 are respectively hydrophilic or of solvent-affinity character. In this case, in the step wherein the surface of the sheet A having the deformable parts 2 and the non-deformable parts 3 (hereinafter referred to as the "process surface") is placed in contact with the hardenable decorative layer 5 and pressure is applied to the resulting laminated structure as indicated in FIG. 6, the deformation of the sheet A occurs automatically.

In this case, there may be a time lag between contact and application of pressure whereby the progress to some extent of the deformation of the sheet A during this time interval cannot be avoided in some cases. Therefore, the phrase "deformation under application of pressure" as used herein is intended to include the case wherein the deformation of the film has already occurred and this deformation is fixed by the application of pressure as the desired unevenness in the hardenable decorative layer 5.

Figure 9:
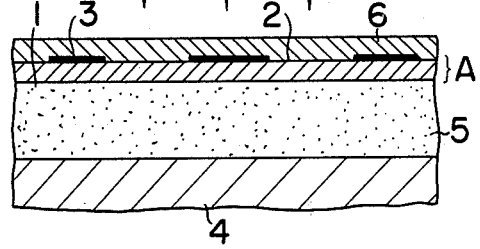

In the case where the deformable sheet A does not satisfy the above stated affinity condition, the procedure indicated in FIG. 9 can be carried out. That is, the deformable sheet A is laminated to the decorative layer 5 with its surface opposite its process surface in contact with the layer 5, the process surface then being on the outer side. A coating of a liquid medium 6 having affinity for the deformation parts 2 is then applied over the process surface, and then pressure is applied to the resulting laminated structure. While, in this case, the clarity of the unevenness pattern is somewhat poorer than that in the case illustrated in FIG. 6, a decorative article which is substantially the same as that shown in FIG. 8 is obtained.

In the above described processes and also in the processes described hereinafter, the peeling off of the deformable sheet A is ordinarily carried out, but this step is not necessary in all cases. In some instances, the decorative article can be utilized with the sheet A adhering thereto.

Figure 10:
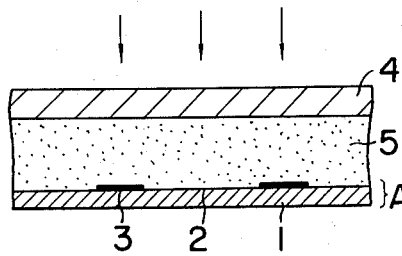

While the magnitude of the pressure applied at the time of deformation to the sheet A differs with the combination of the decorative layer 5 and the deformable sheet A in the process of this invention, it is, in general, from 1 gram/cm.$^2$ to 200 kg./cm.$^2$, preferably from 100 gram/cm.$^2$ to 50 kg./cm.$^2$. The upper limit can be increased further provided that it is within a range wherein the deformation is not obstructed. This pressure is applied by means of a flat plate press or a roller press, by the weight of the decorative material itself, by the weight of metal plates stacked thereon, or by the weight of weights further placed on the stacked plates. Alternatively, as indicated in FIG. 10, the laminated structure is turned upside-down relative to the state shown in FIG. 6, and the weight of the decorative layer 5 is utilized to apply the pressure. In the case of the last decribed mode of pressure application, a casing mold can be used according to necessity.

We have found that, for the deformable sheet utilizing its affinity for the aforementioned liquid, a hydrophilic polyvinyl alcohol film which has been formed by a casting process is highly suitable. Particularly a film material of polyvinyl alcohol (referred to hereinafter as "PVA") of a degree of polymerization of over 700 and a degree of saponification of 75 to 100 percent is desirable. By controlling the degree of polymerization to a value of from 700 to 1,000 and the degree of saponification to a value of from 75 to 85 percent, a PVA of high solubility is obtained. This is excellent for imparting unevenness patterns of good appearance to the decorative layer, but since it dissolves under a high-humidity condition, it has a strong tendency to become integral with a hydraulic decorative layer. When the degree of polymerization is from 1,600 to 1,800 and the degree of saponification is from 95 to 100 percent, a PVA of low solubility is obtained. Since this PVA does not readily dissolve even under a high-humidity condition, it can be peeled off after imparting of the unevenness pattern to the decorative layer.

To the PVA to constitute the starting material of the film, a plasticizer such as a glycol such as ethylene glycol or glycerine; other additives such as a cellulose derivative such as methyl cellulose or carboxymethyl cellulose, starches such as dextrin and other starches, polyacrylic acid derivatives such as polyacrylamide and polymethyl acrylate, and polyethers such as polyethylene oxide; a higher alcohol such as octyl alcohol, an anti-foaming agent such as a silicone anti-foaming agent; and a viscosity stabilizer such as isobutyl alcohol, n-butyl alcohol, cyclohexanone, cyclohexanol, pyridine, phenol, calcium rhodanide, and sodium rhodanide are added as necessary to form an aqueous solution.

Then, by a casting process using a moving casting surface such as that of a heated metal drum, roll, or belt, the solution is cast into a film, which is dried and subjected to heat treatment at, for example, 35° to 45° C. thereby to produce a PVA film. Depending on the necessity, the casting surface can be placed beforehand in desired matted or delustered state. Furthermore, the casting step can be carried out with use of a Tee dye or a roller coater. Also, the solubility of the PVA film thus formed can be decreased by acetalizing it in a sulfuric acid bath.

In the above described preparation of the PVA film, it is preferred for attaining uniformity of deformation that at least one of the above mentioned cellulose derivatives, the starches, the polyacrylic derivatives, and the polyethers be contained in a quantity of 2 to 50 percent by weight in the PVA. It is preferable to use, of these, at least one member of polyacrylamide, polyethylene oxide, methyl cellulose, and starch.

The reason why the above described PVA film is a particularly desirable hydrophilic deformable sheet is that it amply possesses the following characteristics which are desired of a deformable sheet.

(a) The characteristic of amply deforming as a result of the effect of impregnation, swelling or partial dissolution upon contacting a liquid.

(b) The characteristic of possessing excellent printability by a known printing method which is the easiest also as a method of suppressing the affinity of the film 1 for a liquid medium.

(c) The characteristic of being readily peeled off from the decorative layer subsequent to processing. For this characteristic it is necessary that the film have excellent mechanical characteristics also after deformation.

(d) The characteristics of low production cost and adaptability to mass production.

The above described ranges of crystallinity, the degree of saponification, and the degree of polymerization of PVA are desirable for producing the optimum matching of the above enumerated characteristics.

In the foregoing disclosure, the most fundamental mode of practice of this invention has been described. This invention, however, can be practiced in a variety of modified modes as described hereinbelow.

Figure 11:
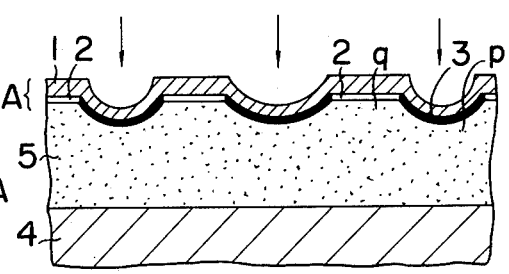

First, ordinarily in many instances, the parts of the decorative layer 5 corresponding to the deformation parts 2 of the sheet A become concave parts p as shown in FIG. 7. However, as shown in FIG. 11, convex parts q can be formed in correspondence to the deformation parts 2. More specifically, the primary factors which determine whether the parts of the decorative layer 5 corresponding to the deformation parts 2 of the sheet A become concavities or whether they become convexities are not entirely clear, but differences in affinity of the decorative layer 5 with respect to the deformation parts 2 and the non-deformation parts 3 can be considered to have a determining effect. Such an action, wherein convex parts q are formed in correspondence to the deformation parts 2 is obtained when, for example, a decorative material containing mixed liquid medium of water and a nonaqueous solvent such as a water-containing polyester resin is used for the decorative layer 5, and a hydrophilic film 1 having non-deformation parts 3 of a hydrophobic resin is used for the sheet A.

Figure 12:
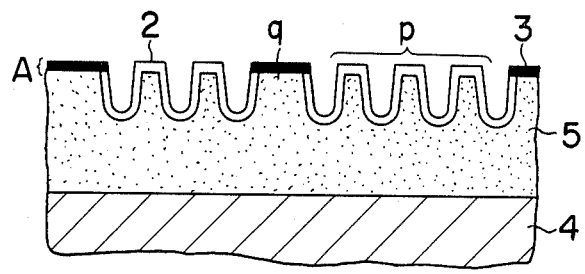
Figure 13:
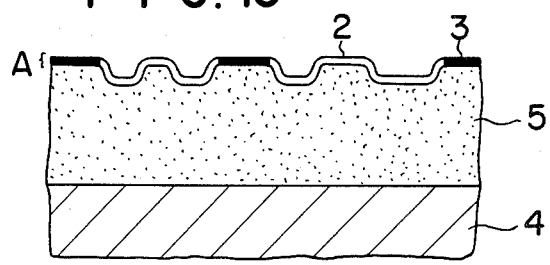

Secondly, in the case where the deformation parts 2 of the deformable sheet A are made relatively wide, the concave parts formed in correspondence thereto (ordinary case) are not simple concave parts as shown in FIGS. 7 and 8 but become an unevenness pattern of fissured shape comprising an aggregation of minute concavities and convexities as shown in FIGS. 12 and 13 (in which the structure of the sheet A is simplified). Accordingly, a composite decorative effect can be expected by the combination of this minute or fissured type unevenness pattern and the convex parts q corresponding to the non-deformation parts 3.

In general, if the spacing of the printed pattern is greater than 2 mm., preferably greater than 5 mm., a minute unevenness pattern will be formed. In the control of the shape of such a minute unevenness pattern, the application of pressure exhibits a pronounced effect. More specifically, in the first place, peaks of the minute convexities are flattened by the application of pressure. The thus flattened peaks contribute to easy recognition of the minute unevenness. Furthermore, a light pressure produces a deformation as shown in FIG. 12, while a heavy pressure produces a deformation as shown in FIG. 13. As the pressure becomes great, the unevenness becomes shallow, and, at the same time, the unit unevenness becomes large. Accordingly, by applying the pressure, not uniformly over the entire surface, but with a magnitude which differs with different local regions of the surface, it is possible to produce a pattern of minute unevenness which changes at different local regions of the surface.

Figure 14:
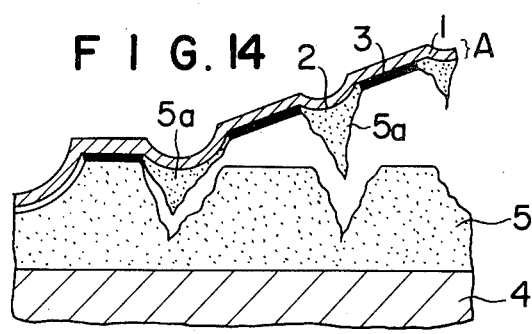

In addition, by causing the adhesive force between the sheet A and the decorative layer 5 at local parts greater than the cohesive force of the decorative layer 5, parts 5a of the decorative layer 5 are ripped off when the sheet A is peeled off as shown in FIG. 14, whereby the unevenness pattern can be changed. In this case, it is desirable to carry out the peeling-off procedure before the decorative layer 5 has fully hardened. Further, the ripping off of the decorative layer 5 at local parts thereof is facilitated by causing the layer 5 to foam thereby to weaken this layer.

Figure 15:
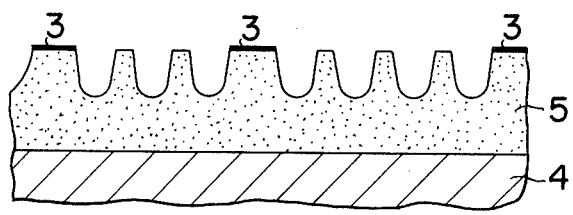

Still another technique comprises using a decorative composition of the yet unhardened decorative layer which has good adhesiveness relative to the vehicle of an ink or adding an ingredient having good adhesiveness relative to the ink vehicle into the decorative composition thereby to impart good adhesiveness to the decorative composition relative to the ink vehicle. Then, when the sheet A is peeled off, the coating pattern 3 provided for the purpose of forming the non-deformation parts on the film 1 is transferred to the decorative layer 5, whereby it is possible to increase the coloring effect of the decorative material. FIG. 15 shows a decorative article obtained in this manner. As one example, when a PVA film is used for the deformable sheet, a nitrocellulose resin for the ink vehicle, and a hydraulic cement for the yet unhardened decorative layer, the ink can be transferred to the decorative material layer by adding 10 parts of emulsified polyvinyl acetate with respect to 100 parts of the water-hardenable cement.

A further procedure comprises providing beforehand on the deformable sheet, in addition to the printed layer 3 for forming the deformation parts, a pattern layer containing a vehicle for dissolving in the hardenable decorative layer (e.g., PVA, methylcellulose, starch, etc., in the case where an aqueous hardenable decorative material is used) and a coloring agent. Then, simultaneously with the imparting of unevenness to the decorative layer, the above mentioned pattern layer can be transferred onto any desired parts of the layer surface thereby to color the same.

After the surface unevenness pattern has been formed, selective filling of concavities with paint or application of paint onto selected convexities can be readily carried out. For this purpose also, the convexities with flat tops formed under application of pressure according to this invention are convenient.

Figure 16:
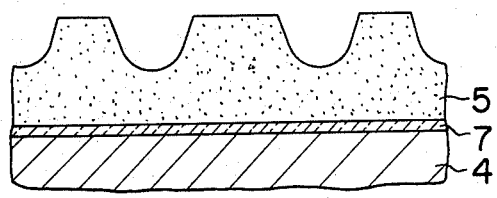

In addition, in the case where the decorative layer 5 is transparent or translucent, a pattern layer or a pattern paper 7 can be provided beforehand under the decorative layer 5 thereby to produce a special effect due to the combination of this underlying pattern and the surface unevenness pattern. One example of a decorative article produced in this manner is illustrated in FIG. 16.

Figure 17:
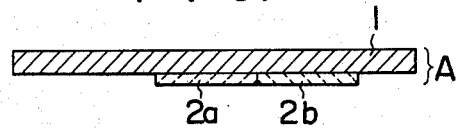
Figure 18:
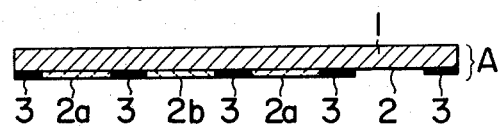

In addition to the aforedescribed procedure for obtaining the deformable sheet A from the deformable film 1, the characteristics such as kind, thickness, crystallinity, and degree of polymerization of the film can be varied at locally different parts or a resin of different degrees of affinity for an affinity liquid can be used as an ink vehicle or applied as a coating thereby to form regions 2a and 2b of locally differing deformability of the film 1 as shown in FIG. 17 or 18.

Figure 19:
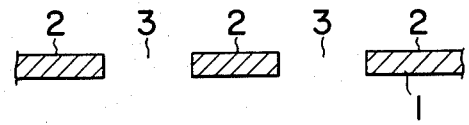

Still another procedure for obtaining the deformable sheet A comprises cutting out parts of the deformable film 1 as shown in FIG. 19, these cut out parts functioning as the non-deformation parts 3. This sheet functions in substantially the same manner as the sheet illustrated in FIG. 1.

In the practice of the process of this invention, the hardenable decorative layer can be formed by pouring the decorative material into a casting mold. Alternatively, the hardenable decorative material can be formed by coating directly on a planar base such as flooring, an inclined base such as a roof, a vertical base such as a wall, or a downwardly facing base such as a ceiling over a foundation such as lathing if necessary. For applying pressure through the deformable sheet to a decorative layer coating on an inclined base, a vertical base, or a downwardly facing base, it is not impossible to use press means having a flat plate, but the use of a pressing roll is more convenient and advantageous. In this connection, as a simplified method, pressing with a trowel is also available.

When, in a decorative article shaped in the manner described above, the decorative layer 5 has not been fully hardened by the shaping step, the article is further subjected to a hardening treatment suitable for the decorative material, thereby to complete the hardening. Examples of methods for this hardening treatment are natural drying or heat drying, natural hardening, hardening by heat, pressure, light, electron beam, microwave, etc., and any other suitable known method.

Decorative articles produced in this manner according to this invention have unique patterns of surface uneveness and are applicable to an extremely wide range of uses, some examples of which are as architectural materials such as interior and exterior materials for walls, ceilings, and the like, as various decorative boards and panels, as materials for sign boards, and as materials for packaging. Furthermore, the surface with an unevenness pattern of a decorative article produced according to this invention can be utilized as the pressing surface of a die plate for producing another separate decorative article of hardenable type by pressing the unevenness pattern surface against the decorative layer of the other article.

In order to indicate more fully the nature and utility of this invention, the following specific examples of practice constituting preferred embodiments of the invention are set forth, it being understood that these examples are presented as illustrative only and are not intended to limit the scope of this invention. Throughout the examples, quantities expressed in "parts" and "percent" are by weight.

EXAMPLE 1

To calcined gypsum, water was added in a quantity of approximately 75 percent, which is the optimum quantity for normal consistency to prepare a liquid coating composition, which was applied as a coating by means of a roll coater on a gypsum plaster board of 12-mm. thickness used as a base as shown in FIG. 2. Separately, a tile pattern measuring 5 cm.×10 cm. was gravure printed with a 1-cm. spacing with ink containing nitrocellulose resin as a vehicle on a sheet of cellophane film of 60-micron thickness (manufactured by Nimura Kagaku K.K., Japan) thereby to provide non-deformation parts thereon. Then, with the above mentioned coating composition in a still unhardened state, the cellophane film was quickly caused to adhere to the decorative layer.

A pressure of 1 kg./cm.$^2$ was applied for 5 minutes under a flat press to the laminated structure. The laminated structure was then removed from the press, and then the liquid coating composition was caused to harden fully. Thereafter the cellophane film was peeled off.

The product thus obtained was found to have a tile-like pattern of convexities corresponding to the printed pattern and, at the same time, to have clear pattern of minute unevenness (of an unevenness unit of approximately 3 mm.) corresponding to the joints of the tiles in regions other than the printed pattern parts. Moreover, as a result of the application of pressure, as incombustible gypsum decorative board having faithfully produced minute unevenness and having, further, a clear boundary between the unevenness and the convexity pattern corresponding to the printed pattern was obtained.

EXAMPLE 2

A coating liquid of the following composition was prepared.
CaSO$_4$.2 H$_2$O: 100 parts PVA: 5 parts
water: 50 parts The coating liquid was applied by the roll coating method to a surface of a calcium silicate board of 6-mm. thickness used as a base. Separately, a striped pattern of 3-cm. spacing and 5-cm. width was offset printed with ink containing a vinyl chloride/vinyl acetate copolymer resin as a vehicle on a 50-micron unoriented nylon film (diamide film produced by Daicel K.K., Japan). This film was caused to adhere to the coating liquid applied as described above. Then, two calcium silicate boards of 6-mm thickness, each of which was the same as the above, were placed on the above film and left for 24 hours to apply pressure. The film was thereafter peeled off. As a result, a decorative board having a striped pattern defined by smooth convex parts and regions other than the pattern of sharp, deep, minute unevennesses (of a unit of approximately 5 mm.) and having, moreover, a clear unevenness pattern at the boundaries between the concavities and convexities was obtained.

EXAMPLE 3

A green mat of asbestos slate composed of the following ingredients was prepared.
asbestos: 15 parts
portland cement: 85 parts
water: 40 parts Separately, a pattern comprising waveforms of 10-mm. width with a spacing of 15 mm. was printed by gravure printing on a PVA film with an ink containing nitrocellulose resin as a vehicle. The printed surface of this film was caused to adhere to the above mentioned green mat, and the laminated structure thus formed was pressed for 5 minutes with a flat press under a pressure of 2 kg./cm.$^2$ The film was thereafter peeled off from the green mat, which was then caused to fully harden. As a result, a decorative asbestos slate board having a pattern of distinct yet smooth waveform convexities corresponding to the ink-printed parts formed on the decorative layer as shown in FIG. 12 and, at the same time, having at other parts of the decorative layer a pattern of deep and sharp fissures of an unevenness unit of approximately 3 mm. was obtained.

The above described process was carried out with a flat press exerting a pressure of 10 kg./cm.$^2$, whereupon a pattern of fissures which were somewhat shallower than those shown in FIG. 12 yet were sharp of an unevenness unit of approximately 5 mm. as shown in FIG. 13 was obtained.

In addition, for purposes of comparison, the process described above was carried out except for the omission of pressure application. As a result, a pattern of minute fissures of an unevenness unit of approximately 2 mm. was obtained, but this pattern had fissures which were inferior in depth and sharpness to those of patterns obtained with application of pressure.

The decorative asbestos slate board produced in the above described manner was spray coated with an acrylic resin-based coloring paint ("Metalac" C, manufactured by Fujikura Kasei, K.K., Japan), and, further, a polyvinyl acetate-based coloring paint of another color was imbeddedly applied by wiping to only the part of fissured pattern. As a result a fissured pattern which was visually accented was obtained.

The above mentioned PVA was obtained in the following manner.

Composition
polyvinyl alcohol: 100 parts
ethylene glycol: 10 parts
corn starch: 40 parts
octyl alcohol: 0.5 part
calcium rhodanide: 0.5 part The above composition was mixed and dissolved and then left at rest for 5 hours for defoaming. Then, by using a heated metal drum, the composition was formed into a film by film casting. More specifically, the composition was wrapped around the metal drum at 40° C. as the composition was treated by a doctor blade to give a final thickness of 40 microns. The composition was thereafter heat treated with a hot air stream at 40° C. from the opposite surface and thereafter wound up. As a result, a hydrophilic resin film of the following physical properties was obtained.

Tensile strength: 1.4 kg·cm
V-notch tearing strength: 0.48 kg
Tensile elongation: 120%
Swelling time (on water surface at 20° C.): 20 sec.

EXAMPLE 4

A wood grain pattern was gravure printed with an acrylic UV curing ink on a piece of the same cellophane film as in Example 1, regions corresponding to vessels of a width of less than 2 mm being left unprinted. This film was used with its printed surface facing upward to line the interior surface of a 30 cm×30 cm mold of 5-mm thickness. Then, a composition of the ingredients specified below was poured into the mold, and a load of 10 kg was applied thereon for 5 minutes.

Composition
Water-containing polyester (mfd. by Nippon Kayaku, K.K., Japan): 100 parts
hardener (methylethylketone peroxide): 2 parts
calcium carbonate: 50 parts
water: 100 parts After the composition hardened, the film was peeled off therefrom, whereupon a wood grain decorative board in which the printing ink had been transferred onto the water-containing polyester, and, moreover, the decorative pattern comprised wood grain pattern parts constituted by convexities and regions other than these pattern parts corresponding to vessels constituted by concavities was obtained.

EXAMPLE 5

10 parts of a polyvinyl alcohol resin (Gosenol manufactured by Nippon Gosei-Kagaku Kogyo, K.K., Japan) was added to the composition of the asbestos slate specified in Example 3, and, with the material thus obtained, the procedure of Example 3 was carried out. As a result, a decorative asbestos slate board in which parts of the green mat had adhered to the polyvinyl alcohol film at parts thereof other than the pattern parts, and minute unevennesses were further formed at the fissured pattern parts was obtained.

Furthermore, when the film was peeled off after the green mat had fully hardened, a decorative asbestos slate board in which an increased quantity of the green mat adhered to the film, and larger unevennesses were formed in the fissured pattern parts was obtained.

EXAMPLE 6

One surface of a sheet of plywood of 2.7-mm thickness was coated with a polyvinyl acetate emulsion by means of a roll coater, and, to this coating, a sheet of paper with a tile pattern printed thereon was caused to adhere by hot pressing. A decorative board composition of the ingredients set forth below was then applied onto this plywood sheet by means of a roll coater. Then, to this coating, a polystyrene film whose regions of 7-mm width corresponding to the tile joints had been caused to deteriorate by ultraviolet rays was caused to adhere, and air bubbles entrapped between the film and the decorative layer were removed by means of a roll.

Decorative board composition unsaturated polyester resin ("Polylite" mfd. by Dai Nippon Inki Kagaku, K.K., Japan): 100 parts
methylethylketone peroxide 2 parts
cobalt naphthenate 0.5 part Thereafter, the laminated structure was subjected to flat pressing for 10 minutes under a pressure of 5 kg/cm$^2$ and at a temperature of 40° C. Then, after the decorative layer was hardened by heating, the polystyrene film was peeled off therefrom. As a result, a polyester decorative board with a tile face having a pattern of minute, sharp, and deep fissures of an unevenness unit of approximately 3 mm at parts corresponding to the parts of the film irradiated with the ultraviolet rays and having other parts of smooth texture was obtained.

EXAMPLE 7

One surface of a gypsum plaster board of 9-mm thickness was coated with a composition of the following ingredients.
 calcined gypsum: 100 parts
 vinyl chloride/vinyl acetate copolymer emulsion: 20 parts
 water: 75 parts To this coating, a methylcellulose film with a circular pattern of cutouts of 10-mm diameter was caused to adhere. The resulting laminated structure was flat pressed for 2 minutes under a pressure of 0.5 kg/cm$^2$, and the coated composition was hardened by drying. As a result, the parts corresponding to the cutouts became convexities, and a pattern of sharp minute unevennesses were obtained at the other parts of the film. Moreover, a decorative gypsum plaster board of non-combustible character which had good planarity over its entire surface was obtained.

EXAMPLE 8

A film of polyester ("Lumilar", manufactured by Toray, K.K., Japan) of 12-micron thickness was provided with cutouts of the same pattern as in the film described in Example 7 was laminated adhesively with a vinylon film (manufactured by Tokyo Cellophane, K.K., Japan). The resulting laminated structure was caused to adhere to the coated liquid as described in Example 1 with the polyester film in contact with the coating liquid. The resulting laminated structure was then flat pressed for 5 minutes under a pressure of 1 kg/cm$^2$. Thereafter, the decorative layer was hardened by drying. As a result, a decorative gypsum plaster board of non-combustible character which had a pattern of minute sharp fissures of an unevenness unit of approximately 3 mm at its parts exposed to the vinylon film, and which had good planarity over its entire surface was obtained.

EXAMPLE 9

A polystyrene film on which a pattern except for regions corresponding to the joints of 7-mm width of tiles had been gravure printed with acetylbutyrilcellulose-base ink was prepared. This polystyrene film was caused to adhere on the same base board and coating liquid as in Example 7. The resulting laminated structure was then flat pressed for 10 minutes under a pressure of 5 kg/cm$^2$ and at a temperature of 40° C., and the decorative layer was hardened by drying, whereupon the ink printed parts were caused to foam by the polyester, and, on the other hand, in the parts not ink printed, the film was attacked by the styrene monomer, whereby wrinkles were formed. As a result, a pattern of minute sharp fissures of an unevenness unit of approximately 3 mm was formed on the board surface, whereby a polyester decorative board of a beautiful tile motif having minute unevennesses with convexities of good surface planarity at the concave parts in large unevennesses was obtained.

EXAMPLE 10

Joint strips were attached to a concrete wall, and thereafter a mortar of the following composition was applied onto the wall.
 portland cement: 100 parts
 sand: 200 parts
 water: 60 parts The mortar surface was scraped and smoothed by a ruler flush with the joint strip surface thereby to form a backing.

Over this backing a cement composition of the following ingredients was applied by trowelling to a thickness of 2 mm thereby to form a decorative layer.
 portland cement: 100 parts
 asbestos: 5 parts
 Metholose: 0.1 part
 water: 50 parts Separately, a polyvinyl alcohol film was gravure printed with an ink having a melamine resin and a cellulose resin as a vehicle. The printed surface of this film was caused by using a brush to adhere to the surface of the above mentioned decorative layer, and the unprinted parts of the polyvinyl alcohol film were caused to deform. Then, by means of (1) a pressing roll in one instance and (2) a trowel in another instance, the deformed film parts were pressed into the surface of the cement composition. Thereafter, the polyvinyl alcohol film was peeled off. As a result, a cement wall surface having an unevenness pattern with flat convexities was obtained in each of the instances (1) and (2).

After the cement had been caused to set, its entire surface was painted by spraying with an acryl emulsion-base paint. Then, only the convexities of the surface were colored with a paint of the same kind but different color by means of a roll, whereupon a colored cement wall surface of visually rich unevenness texture was obtained.

What is claimed is:
1. A process for producing decorative articles having patterns of surface concavities and convexities, which comprises the steps of:
 (1) placing into mutual contact and laminating a deformable layer of hardenable decorative material and an expansion-contraction deformable sheet provided with first regions susceptible to expansion-contraction deformation, said sheet further provided with second regions not susceptible to said deformation, or third regions whose degree of susceptibility to said deformation differs from that of said first regions, or a combination of said second and third regions;

(2) causing the deformable sheet to undergo said deformation, thereby to impart a pattern of concavities and convexities corresponding to the regions provided on the deformable sheet to the surface of the decorative material layer in contact with the sheet;

(3) pressing the surface of the deformable sheet which is not in contact with the deformable layer with sufficient pressure to flatten the tops of the convexities and accentuate the margins between the convexities and the concavities before the deformable layer has fully hardened; and (4) causing the hardenable decorative material layer to fully harden.

2. A process according to claim 1 in which the deformable sheet has a property of undergoing said deformation upon contacting the hardenable decorative material layer.

3. A process according to claim 2 in which the hardenable decorative material is a hydraulic composition containing water and at least one member selected from the group consisting of hydraulic cements and gypsum, and the deformable sheet comprises a hydrophilic resin.

4. A process according to claim 2 in which the hardenable decorative material is a hardenable resin containing a non-aqueous solvent, and the deformable sheet comprises a substance having affinity for the non-aqueous solvent.

5. A process according to claim 1 in which step (2) comprises applying a substance for causing the deformable sheet to deform to the surface of the deformable sheet which is not in contact with the hardenable decorative material layer.

6. A process according to claim 5 in which: the hardenable decorative material is a hydrophobic hardenable liquid resin; the deformable sheet is a hydrophilic resin; and the sheet is coated with water in step (2).

7. A process according to claim 5 in which: the hardenable decorative material is a hydraulic composition; the deformable sheet comprises a hydrophobic resin; and the sheet is coated with an organic solvent having affinity for the hydrophobic sheet in step (2).

8. A process according to claim 1 in which the first regions of the deformable sheet are of a sufficiently large area to form minute concavities and convexities in the decorative material layer in contact with the region as a result of the deformation thereof.

9. A process according to claim 1 further comprising a process step of peeling off the deformable sheet from the decorative material layer after step (3) and either before or after step (4).

10. A process according to claim 1 in which the deformable sheet comprises a polyvinyl alcohol film formed by the casting method.

11. A process according to claim 10 in which the degree of polymerization and the degree of saponification of the polyvinyl alcohol are respectively higher than 700 and from 75 to 100 percent.

12. A process according to claim 10 in which the polyvinyl alcohol film contains from 2 to 50 percent by weight of at least one member selected from the group consisting of cellulose derivatives, starches, polyacrylic acid derivatives, and polyethers.

13. A process according to claim 12 in which the polyvinyl alcohol film contains at least one member selected from the group consisting of polyacrylamide, polyethylene oxide, methylcellulose, and starches.

14. A process according to claim 1 in which the deformable sheet comprises a resin film having affinity for a specific liquid, and the second regions not susceptible to deformation are formed on the resin film by a coating pattern of an ink containing as a vehicle a resin having no affinity for the specific liquid.

15. A process according to claim 14 in which, by using a decorative material layer comprising a decorative composition having high adhesiveness with respect to the vehicle resin in the coating pattern of the ink, the ink coating pattern is transferred to the decorative material layer when the deformable sheet is peeled off from the decorative material layer subsequent to the forming thereof.

16. A process according to claim 1 in which the deformable sheet is provided beforehand with a pattern layer containing a vehicle and a coloring agent which are soluble in the hardenable decorative material layer, and, simultaneously with the imparting of the concavities and convexities to the decorative material layer, the pattern layer is transferred to a desired part of the surface of the decorative material layer.

17. A process according to claim 1 in which the pressure is applied by a flat press, a roller press, or a trowel or by the weight of the hardenable decorative material layer due to gravity.

18. A process according to claim 1 in which the applied pressure is from 1 gram/cm$^2$ to 200 kg/cm$^2$.

19. A process according to claim 1 in which the applied pressure is from 100 gram/cm$^2$ to 50 kg/cm$^2$.

* * * * *